United States Patent
Golaup et al.

(10) Patent No.: US 8,774,823 B2
(45) Date of Patent: Jul. 8, 2014

(54) CELLULAR NETWORK LOAD BALANCING

(75) Inventors: Assen Mahaboob Khan Golaup, Newbury (GB); Alexej Kulakov, Düsseldorf am Seestern (DE); Timothy James Frost, Madrid (ES)

(73) Assignee: Vodafone IP Licensing Limited, Newbury, Berkshire (GB)

(*) Notice: Subject to any disclaimer, the term of this patent is extended or adjusted under 35 U.S.C. 154(b) by 97 days.

(21) Appl. No.: 13/065,265

(22) Filed: Mar. 17, 2011

(65) Prior Publication Data

US 2011/0256880 A1 Oct. 20, 2011

(30) Foreign Application Priority Data

Mar. 17, 2010 (GB) .................................. 1004380.0

(51) Int. Cl.
*H04W 72/00* (2009.01)

(52) U.S. Cl.
USPC ............ 455/453; 455/444; 455/450; 455/451; 455/452.1; 455/452.2; 370/329; 370/341

(58) Field of Classification Search
USPC ........... 455/436–444, 450, 451, 452.1, 452.2, 455/453; 370/232, 329, 341
See application file for complete search history.

(56) References Cited

U.S. PATENT DOCUMENTS

| | | | |
|---|---|---|---|
| 2009/0046665 A1* | 2/2009 | Robson et al. | 370/332 |
| 2009/0190500 A1 | 7/2009 | Ji et al. | |
| 2011/0007712 A1* | 1/2011 | Lee | 370/332 |

FOREIGN PATENT DOCUMENTS

| | | |
|---|---|---|
| EP | 2296394 A1 | 3/2011 |
| GB | 2445988 A | 7/2008 |
| GB | 2452794 A | 3/2009 |
| WO | WO 2007/047669 A1 | 4/2007 |
| WO | WO 2009/035983 A1 | 3/2009 |
| WO | WO 2009/129413 A2 | 10/2009 |
| WO | WO 2009/132709 A1 | 11/2009 |

OTHER PUBLICATIONS

3GPP TS 36.300 V9.2.0 (Dec. 2009), $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), 178 pp.

* cited by examiner

*Primary Examiner* — Wayne Cai
(74) *Attorney, Agent, or Firm* — Muirhead and Saturnelli, LLC (57) ABSTRACT

A method and system are disclosed for operation of a cellular network comprising a first base station, a second base station and a mobile station being served by the first base station. Load information is received from the second base station at the mobile station, the load information indicating a load placed on the resources of the second base station and a load indication based on the received load information is communicated from the mobile station to the first base station. The first base station may be a macrocell base station and the second base station may be a non-planned or femtocell base station.

22 Claims, 4 Drawing Sheets

CELLULAR NETWORK LOAD BALANCING

TECHNICAL FIELD

This application relates to a method of operating a cellular network, a computer program configured to carry out the method, a femtocell base station of a cellular network and a mobile station of a cellular network.

BACKGROUND OF THE INVENTION

Cellular network deployments are increasingly heterogeneous, in that they comprise a range of different types of base station. Typical base stations, having a large coverage area, may be referred to as macrocell base stations. Additionally, there may be a dense distribution of smaller cells, called femtocells. These may be created by access points called Home Base Stations (HBTSs). In the context of Third Generation Partnership Project (3GPP) Universal Mobile Telecommunications System (UMTS), these are referred to as Home Node B (HNB) and in the context of 3GPP Long Term Evolution (LTE) as Home eNode B (HeNB).

The femtocells can be deployed on the same carrier frequency or different carrier frequency to the macrocells. However, whereas the deployment of macrocell base stations is normally planned (in other words, the operator provides the configuration to the base station which indicates all the backhaul interface relations with other neighbouring macrocell base stations), the femtocells may be deployed in an uncoordinated manner. In view of the uncoordinated deployment and large number of HBTSs, the Macrocell Base Station (MBTS) is unlikely to be able to maintain a transport connection to all neighbouring HBTSs or HBTSs within the coverage area of the MBTS. Also, HBTSs can restrict access, partially or exclusively, to members of a Closed Subscriber Group (CSG). Where access is partially restricted to a CSG (members of the CSG having preferential usage of the base station's resources), the HBTS can be referred to as a hybrid cell. These issue's can present challenges for handover. Some of these are addressed in 3GPP TS 36.300 10.5.1.2, which is incorporated herein by reference, by enabling mobile stations to provide an MBTS with sufficient information about the HBTSs so that the MBTS can establish a transport connection towards the HBTS and perform the handover.

Load balancing is increasingly a desirable feature for cellular networks. For UMTS and LTE, an implementation is described in 3GPP TS 36.300 22.4.1, which is incorporated herein by reference. Exchanging load information between base stations, termed load reporting, allows load balancing to be effected. Load reporting is implemented over the X2 or S1 interfaces, which are backhaul channels. The use of the X2 and S1 interfaces are natural choices for exchanging the load indicators when the backhaul connections actually exist between the two network entities.

In the case of HBTSs, it is not desirable (or even possible) for the MBTS to maintain an interface with all HBTSs. Thus, in the context of load balancing between MBTS and HBTS, it is not possible to exchange load balancing information between neighbouring nodes as a backhaul connection is not established in most cases.

Moreover, the use of CSG and hybrid cell implementations has further complicated load balancing procedures. This is especially the case in terms of relevant load indicators to provide a true reflection of the spare capacity of the HBTS being used by members and non-members of the cell.

SUMMARY OF THE INVENTION

According to the system described herein, a method is provided of operating a cellular network comprising a first base station, a second base station and a mobile station being served by the first base station. The method comprises: receiving load information from the second base station at the mobile station, the load information indicating a load placed on the resources of the second base station; and communicating a load indication based on the received load information from the mobile station to the first base station.

By communicating the load information from the second base station (which is advantageously a home base station or Closed Service Group cell base station) to the mobile station, this information can be readily provided to the first base station. This avoids the need to use backhaul channels. Existing approaches communicate load information only through backhaul channels, but such channels may be difficult to identify or not exist for smaller, unplanned or restricted access base stations The first base station may be a macro base station. The macro base station may comprise one of: an Radio Network Controller (RNC); a Node B; and an eNode B. Beneficially, the second base station is a non-planned base station or a femtocell base station. A femtocell base station may comprise an open cell base station, a Closed Service Group cell base station or a hybrid cell base station.

In an embodiment, the method further comprises: receiving a command at the mobile station from the first base station to identify at least one base station and to provide a load indication in respect of the identified at least one base station; and identifying the existence of the second base station at the mobile station. The first base station can thereby initiate a discovery process for smaller base stations, about which it is unaware.

The command to identify at least one base station may comprise an instruction broadcast by the first base station in system information for the mobile station. This command may instruct the mobile station to detect a Home Base Station or femtocell base station. Alternatively, the command to identify at least one base station may comprise a dedicated message in connected mode to detect a Home Base Station or femtocell base station. In either case, the Home Base Station or femtocell base station may be on the same or different carrier frequency and it may use the same or a different Radio Access Technology.

Additionally or alternatively, the mobile station can identify the existence of the second base station without instruction from the first base station. For example, the first base station can become aware of the second base station as part of the normal handover process initiated by mobile station, reporting the presence of the second base station in its measurement reports to the first base station. In such cases, the method may further comprise: initiating a handover process for the mobile station from the first base station to the second base station. During the handover process, the mobile station discovers an identity for the second base station and reports this to the first base station. The identity advantageously may include routing information. The load information may then be received at the mobile station from the second base station together with the relevant information for the handover process. This is then forwarded by the mobile station to the first base station.

Optionally, the step of communicating the received load information from the mobile station to the first base station may comprise transmitting a load indication message from the mobile station to the first base station, indicating load information and routing information for the second base station. Alternatively, the step of communicating the received load information from the mobile station to the first base station may comprise transmitting a measurement report from the mobile station to the first base station, in response to a dedicated measurement configuration, to indicate load information and routing information for the second base station.

The load information can take various forms. Optionally, the load information comprises an indication of resource usage at the second base station, relating to a group of mobile stations being served by the second base station. Alternatively, the load information may be a simple overload indication. The load information may be divided according to the different type of access. For example, the group of mobile stations being served by the second base station may comprise one or more of: guaranteed bit-rate, GBR, mobile stations; non-GBR mobile stations; member mobile stations of a closed service group of the second base station; and mobile stations that are not members of a closed service group of the second base station. In this way, load information for one or more of these groups can be provided.

In some cases, the load information may indicate the actual resource usage at the second base station. Optionally, the indication of resource usage relates to a predetermined quantity of resources reserved by the second base station for the purpose of relieving congestion in the first base station. The indication of resource usage may relate to a number of factors, which may comprise one or more of: hardware resource; backhaul transport resource; and radio resource. In this case, the indication of resource usage may be termed a composite load indication.

The load indication transmitted by the mobile station to the first base station is optionally the same as the load information received by the mobile station from the second base station. Alternatively, the load indication may be different, but based on the received load information. The load indication need not even identify the load upon the second base station.

The load indication is beneficially used for load balancing. The method may further comprise determining a load balancing configuration, based on the received load information for the second base station. The load balancing configuration may then be effected by a communication from the mobile station or from the first base station. In embodiments, this communication may be the load indication specified above, although in alternative embodiments it may be a different communication.

In some embodiments, the method further comprises: determining a load balancing configuration at the first base station, based on the received load indication for the second base station; and communicating instructions from the first base station in order to effect the determined load balancing configuration. The first base station uses the information provided by the mobile station (and optionally other mobile stations) to effect load balancing. This may involve communication with other base stations, communication with mobile stations or both.

Optionally, the instructions from the first base station are directed to the second base station through a backhaul communications channel and comprise an instruction for the second base station to increase its downlink transmission power. This causes the coverage area for the second base station to be increased. As a result, the mobile station may detect the extended coverage area (through signal strength measurements) and, based on the reported measurements, the first base station may initiate handover of the mobile station to the second base station. This may reduce the load on the first base station. In an alternative, the instructions from the first base station are directed to the second base station through a backhaul communications channel and comprise an instruction for the second base station to decrease its downlink transmission power. This would promote handover from the second base station to the first base station.

Additionally or alternatively, the instructions from the first base station may be directed to the mobile station and comprise instructions causing handover of the mobile station away from the first base station. This may be achieved by changing the handover related parameters in system information for the first base station, the adjusted handover parameters encouraging the mobile station to handover. When the updated system information is received by the mobile station, the adjusted parameters may encourage the mobile station to initiate handover by comparison with parameters for the second base station. Optionally, the instructions from the first base station directed to the mobile station comprise instructions directing the mobile station to handover to the second base station. In other words, the first base station may explicitly direct the mobile station to handover to the second base station, especially irrespective of the radio conditions. This may be specifically effective when the first base station (an MBTS) and second base station (an HBTS) operate on different carrier frequencies.

In alternative embodiments, the method further comprises: determining a load balancing configuration at the mobile station, based on the received load information for the second base station; and wherein the load indication comprises an indication to effect the determined load balancing configuration. Here, the mobile station may use the received load information from the second base station, to determine whether it should or should not be handed over to the second base station. For instance, the received load information may indicate that the second base station is congested and the mobile station may autonomously decide to provide an indication to the first base station that would prevent the first base station from initiating the handover of the mobile station to the second base station.

Then, the mobile station may indicate to the first base station that it is not allowed access to the second base station. The load indication consequently indicates no more than that the second base station is not available for the mobile station, based on the load information.

In this case, the first base station should not initiate handover to the second base station. In one embodiment, the mobile station may reuse already specified signalling meant to indicate access rights to a cell with a CSG identity to indicate no access right to the second base station. Here, the load balancing indication is therefore implemented using signalling that is not normally used for load balancing. However, a load balancing effect results from this signalling.

In an embodiment, the second base station does not restrict access only to members of a Closed Subscriber Group. Load balancing involving a base station which restricts access only to members of a Closed Subscriber Group is less advantageous and therefore not preferred.

Optionally, the first base station and second base station may differ in their carrier frequency, their radio access technology or both. Alternatively, the first base station and second base station may use the same carrier frequency and the same radio access technology.

In another aspect, the system described herein may be found in a computer program stored on a computer readable medium, configured when operated on a processor to carry out the method as described herein. The computer program may be split in its functionality over different logical or geographical entities within or connected to the cellular network. The computer program comprises an algorithm according to the system described herein. The system described herein may additionally or alternatively be embodied in hardware, fixed logic or programmable logic or a combination of these. The combination can also include software.

In a further aspect, the system described herein provides a femtocell base station of a cellular network, comprising: a downlink transmitter; and a controller, configured to control the downlink transmitter to transmit load information, the load information indicating a load placed on the resources of the femtocell base station.

In yet another aspect, a mobile station of a cellular network is provided, comprising: a downlink receiver; an uplink transmitter; and a controller, configured to control the downlink receiver and uplink transmitter to allow the mobile station to be served by a first base station and further configured to control the downlink receiver to receive load information from a second base station, the load information indicating a load placed on the resources of the second base station. Beneficially, the controller is further configured to control the uplink transmitter to transmit a load indication based on the received load information to the first base station.

The femtocell base station or mobile station may additionally comprise features arranged to implement any of the features described with reference to the method of operation detailed herein.

It will also be understood that the system described herein is not limited to the specific combinations of features explicitly disclosed, but also any combination of features that are described independently and which the skilled person could implement together.

BRIEF DESCRIPTION OF THE DRAWINGS

Embodiments of the system described herein will now be explained by way of example only and with reference to the accompanying drawings in which.

DETAILED DESCRIPTION OF VARIOUS EMBODIMENTS

Figure 1:
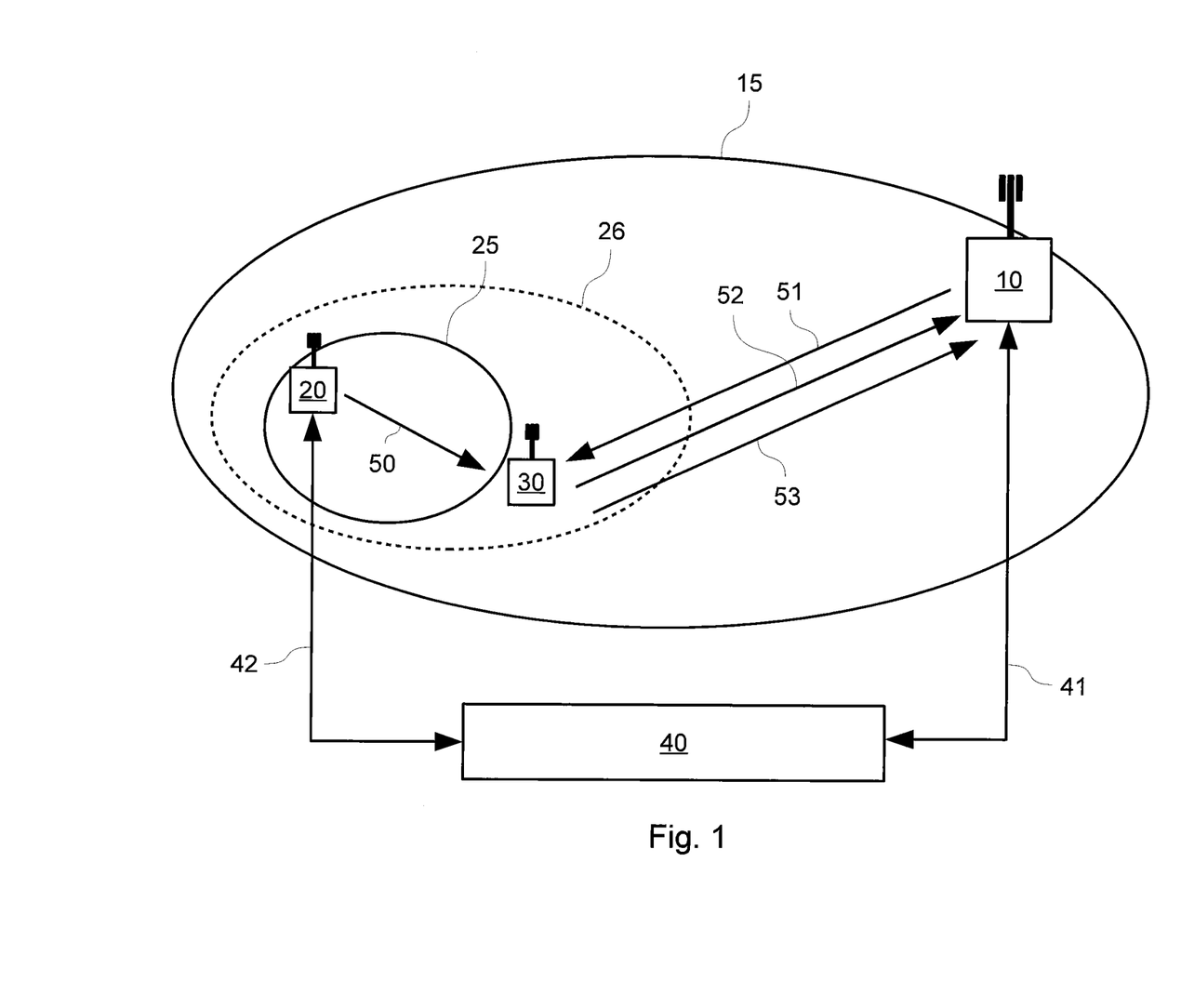
FIG. 1 shows a schematic illustration of a wireless cellular network, implementing a first embodiment of the system described herein.

Referring first to FIG. 1, there is shown a schematic illustration of a wireless cellular network, implementing a first embodiment of the system described herein. The wireless cellular network comprises: an MBTS 10; an HBTS 20; a mobile station (or equivalently User Equipment, UE) 30; and core network 40. Although the term mobile station is used, this is to be understood as an equivalent to the term UE used in 3GPP documents.

The coverage area for the MBTS 10 is provided by macro coverage area 15 and the coverage area initially provided by HBTS 20 is shown as femtocell coverage area 25. The mobile station 30 becomes aware of the existence of the HBTS 20 because the HBTS 20 broadcasts "system information" 50. The system information 50 comprises the global cell identity of the cell provided by the HBTS 20.

Moreover, the system information 50 may also comprise: a load indication; a Closed Subscriber Group (CSG) identity; and an indicator which allows the UE to determine the access mode type of the cell. The access mode type will indicate any restriction on access to the HBTS 20, for example the existence of a CSG or its structure as hybrid cell. The CSG identity allows a UE to determine if it is a member.

In a first instruction 51, the MBTS 10 commands the mobile station 30 to detect femtocells and report any detected. Femtocells may imply any cells with a Closed Subscriber Group or hybrid cells. The mobile station 30 then detects the presence of the HBTS 20 if it has not done so already and acquires system information 50. This system information 50 includes the load indication.

The mobile station 30 then sends a measurement report 52 relating to the detected HBTS 20 to the MBTS 10. This measurement report may indicate: the global cell identity; the Physical Cell Identity (PCI); the load indication; CSG identity; access mode type; and received signal strength at the mobile station 30 of the HBTS 20 and the MBTS 10. For example, the received signal strength may be a Reference Signal Received Power (RSRP) or Reference Signal Received Quality (RSRQ), in the context of LTE. These terms are defined in 3GPP Technical Specifications.

In this way, the MBTS 10 builds up a table of the load indications for each HBTS 20 which has been reported by mobile station 30 or another mobile station. The mobile station 30 includes the load indication together with other system information as detailed above. The reported system information may be used to resolve physical cell identity confusion. Over a certain period of time, the MBTS 10 can build up a data base of HBTSs under its coverage and their load status.

An optimization of this procedure might use knowledge at the MBTS 10 of the location for the mobile station 30 and the location of the HBTS 20. Then, the MBTS 10 may subsequently only rely on the reported physical cell identity of the detected HBTS to deduce the identity of the target HBTS 20 without needing the UE 30 to read the system information of the detected cells again. The MBTS 10 may then rely on the database which details the routing information of the detected cell and its load status to decide whether UE 30 can be handed over to the HBTS 20.

The MBTS 10 can consider the received load indication to be valid for a certain period of time. In case of congestion, the MBTS 10 can use the information available to decide whether to implement load balancing.

Once the MBTS 10 has gathered the load indications from the mobile station 30 in the vicinity of the HBTS 20 (and optionally from other mobile stations in the vicinity of the same or different HBTSs), the MBTS 10 implements a Self-Organising Network (SON) load balancing algorithm. The load balancing algorithm can decide on the possible action to take to reduce loading on the MBTS 10. Depending on the congestion level at the MBTS 10 and load indications from HBTSs, the SON load balancing algorithm may trigger further actions on the HBTS 20. It will be clear that further actions can be triggered on more than one HBTS, where multiple HBTSs are detected.

Specifically, the MBTS 10 may use a backhaul channel 41 to the core network 40 and a second backhaul channel 42 to the HBTS 20 to instruct the HBTS 20 to increase its transmission power. By so doing, its femtocell coverage area 25 increases in size and becomes new femtocell coverage area 26. The MBTS 10 can target any HBTSs indicating low load, and with mobile stations in their vicinity, to increase their transmission power and hence their coverage area. This promotes handover towards the HBTS, for example by allowing mobile stations to send measurement reports for HBTS cells when the necessary events are triggered by radio conditions, which will subsequently trigger a normal handover procedure. Alternatively, the MBTS 10 may force a UE 30 to handover to HBTS 20 without prior radio measurements being received.

For mobile stations which are not members of a HBTS cell with a CSG, increasing the HBTS transmission power can be detrimental to those mobile stations, unless there is an alternative coverage facility to which the MBTS 10 can handover the mobile station. To avoid problems, this load balancing algorithm (relying on increase of transmission power for HBTS 20) can only be applied to HBTSs operating in open access mode or hybrid access mode. In other words, the load balancing algorithm is not applied to HBTSs operating in a closed access mode with only CSG access. It is also assumed that the HBTS coverage area 25 substantially overlaps with the MBTS coverage area 15.

The mobile station 30 will acquire system information 50 for an HBTS, such as the HBTS 20, when it receives a trigger provided by first instruction 51. The first instruction 51 is optional though. The mobile station 30 may provide information about the HBTS 20 as a result of a handover procedure. The MBTS 10 may store this indication for use later, as explained above.

The first instruction 51 is usually when MBTS 10 sends a 'load balancing required' bit in its system information transmission. This may be accompanied by a list of PCIs (for femtocells). This may be restricted to cells with the same carrier frequency layer, same Radio Access Technology (RAT), different carrier frequency layer or different Radio Access Technology. The mobile station 30 is instructed to obtain system information and report to the MBTS 10 the necessary information for load balancing purposes.

The mobile station 30 is therefore provided some form of autonomous gaps, when it can adjust its receiver or transceiver away from the transmissions of MBTS 10, to measure other carrier frequencies. If the mobile station 30 is in connected mode, it is informed of the system information change by paging. Only if the mobile station 30 detects an HBTS and has been able to acquire the system information, will it send a report back to the MBTS 10 containing the load indication and associated information. This will be passed to the network. The message used to report the load indication is different from the existing measurement reporting mechanism, which requires a measurement identity to be associated with each measurement report. This reduces the level of dedicated signalling required.

Alternatively, since the mobile station 30 is in a connected mode with the MBTS 10, the network can send a dedicated measurement configuration to the mobile station 30. This instructs the mobile station 30 to acquire system information of cells with a CSG or a hybrid cell PCI. Again, this may be restricted to cells with the same carrier frequency layer, same Radio Access Technology, different carrier frequency layer or different Radio Access Technology. Once the system information has been acquired, the mobile station 30 sends a measurement report to the network.

However, this may require additional signalling generated by the MBTS 10 requesting all connected mode mobile stations to perform System Information (SI) acquisition to report load indicator and other related information. In most cases, only a fraction of the mobile stations will be able to detect HBTSs and read the relevant system information. Thus, the extra signalling for reporting of the load indication by connected mode UEs may not be significant.

As explained above, the HBTS 20 communicates its load status in the system information 50. The load status may take several forms.

1) The load status may be indicative of the actual resource usage of the HBTS 20. Optionally, a detailed indication of resources used by: Guaranteed Bit-Rate (GBR) mobile stations; non-GBR mobile stations, members of a CSG (where there is a CSG); and non-members of the CSG (where there is a CSG).

2) The load indication may be semi-static. This indicates the quantity of resources that the HBTS 20 has reserved for the purpose of relieving congestion in MBTS 10.

3) A simple overload indicator may be used by the HBTS 20 when it is too congested to receive more traffic.

4) The load indication may be a composite load indication. This indicates the quantity of resources available in the HBTS 20 based on a number of factors. These may include: hardware resource usage; backhaul transport usage; and radio resource usage. This is usually preferred.

In all cases, the load indication provided by the HBTS 20 to the mobile station 30 takes into account the proportion of resources being used by members and non-members of the cell CSG, where a CSG exists. It is likely that resources being used by members cannot be reallocated. However, resources being used by non-members could be preferentially allocated to members of the cell. At the time of load reporting, members may be connected to the MBTS 10.

Figure 2:
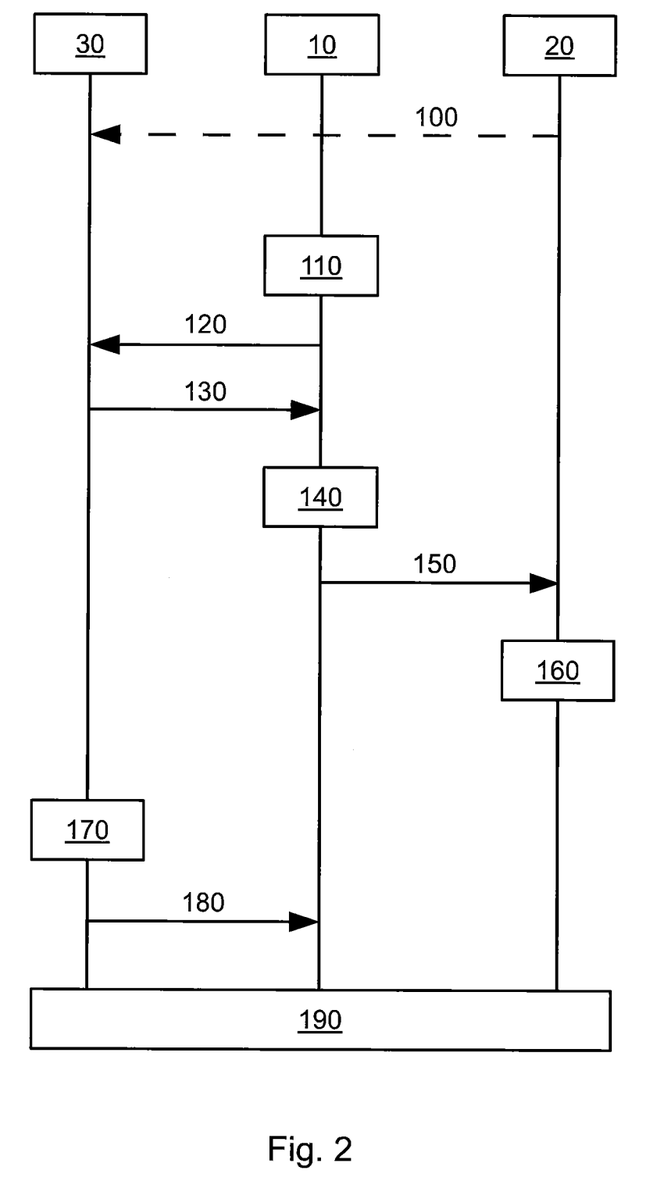
FIG. 2 shows an example of data flow between parts of the cellular network according to FIG. 1.

Referring now to FIG. 2, there is shown an example of data flow between parts of the cellular network according to FIG. 1. Initially, system information 100 is broadcast from HBTS 20 to the mobile station 30. In detection step 110, the MBTS 10 detects that the load is greater than a threshold level. The MBTS 10 then sends a request command 120 to the mobile station 30 and in response, the mobile station 30 transmits a reply message 130. In one approach, the request message 120 can be an RRC measurement configuration and the reply message 130 may be an RRC measurement report 130. Alternatively, the request message 120 may have two parts: a first part being a SYS information message (with a request for all UEs to perform detection of HBTS cells) and a second part being an RRC paging with SYS information change message (to trigger the UE 30 to read the instruction is SYS Information message). In that latter case, the reply message 130 is a load indication message.

The MBTS 10 then implements load balancing 140. The MBTS implements an SON algorithm which evaluates the measurement reports received from mobile stations. In view of this, the MBTS 10 then transmits a power up indication 150 over the S1 interface to the HBTS 20. This causes power up step 160, in which the HBTS 20 increases its transmission power in the downlink.

The mobile station 30 then generates a measurement report for handover 170. It transmits the measurement report 180 to the MBTS 10. Finally, handover 190 for the mobile 30 proceeds as normal from the MBTS 10 to the HBTS 20.

Figure 3:
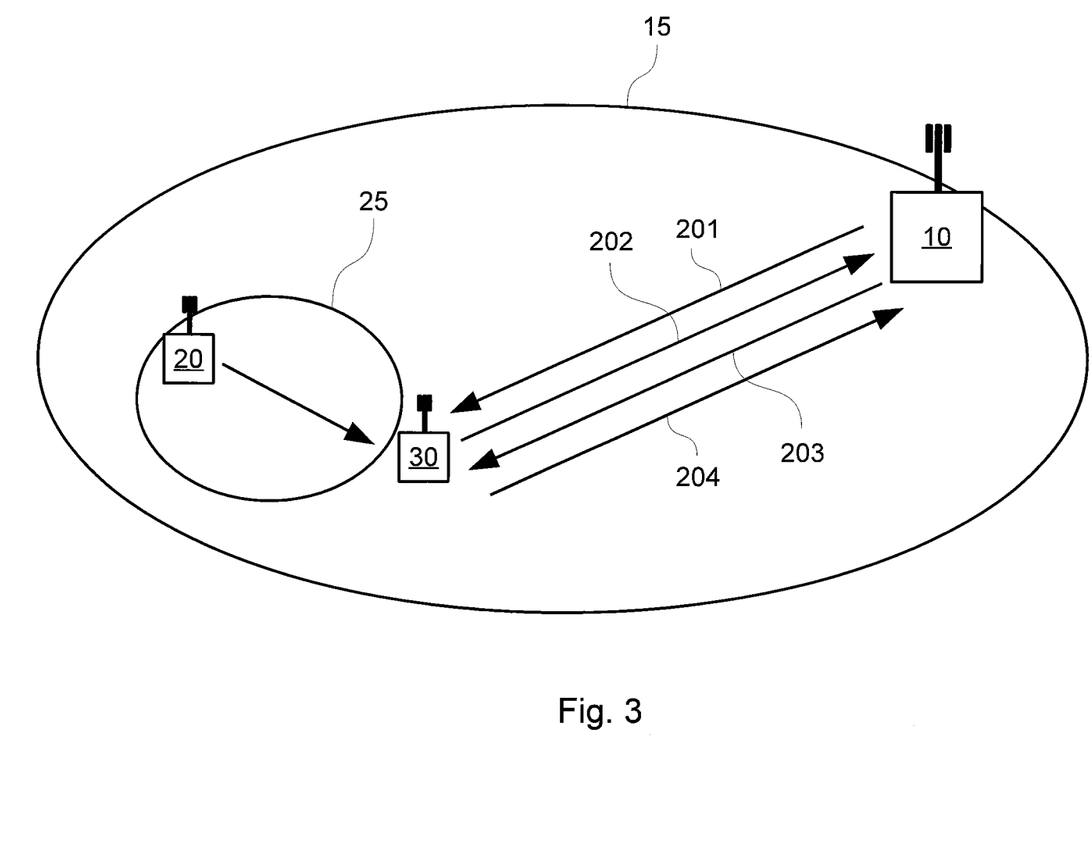
FIG. 3 shows a schematic illustration of a wireless cellular network, implementing a second embodiment of the system described herein.

In an alternative approach to the one described above, the SON load balancing algorithm can relieve congestion at the MBTS 10 by changing the handover related parameters for a mobile station 30 which has reported a PCI for the HBTS 20 by dedicated signalling. Referring to FIG. 3, there is shown a schematic illustration of a wireless cellular network, implementing a second embodiment of the system described herein according to this approach. Where the same features are indicated in FIG. 3 as in FIG. 1, identical reference numerals are used.

In this approach, the mobile station 30 is encouraged to handover to the HBTS 20, thereby relieving congestion on the MBTS 10. In such approaches, the mobile station 30 being served by the MBTS 10 is usually on the edge of the femtocell coverage area 25 that is at least partially within the macrocell coverage area 15.

The MBTS 10 transmits a first instruction 201. This is essentially the same as the first instruction 51 described with reference to FIG. 1. The mobile station 30 then detects the presence of the HBTS 20 if it has not done so already and acquires system information 50. This system information 50 includes the load indication.

The mobile station 30 then sends a measurement report 202 relating to the detected HBTS 20. This is again similar to the measurement report 52 described with reference to FIG. 1. Again, the MBTS 10 builds up a table of the load indications for each HBTS 20 which has been reported by mobile station 30 or another mobile station accordingly.

Once the MBTS 10 has gathered the load indications, the MBTS 10 again implements a Self-Organising Network (SON) load balancing algorithm. However, this is implemented by transmission of new handover parameters 203 from the MBTS 10 to the mobile station 30. The mobile station 30 sends a further measurement report 204 for the HBTS 20 and triggers the normal handover procedure.

If the HBTS 20 uses a different carrier frequency or RAT, the MBTS 10 can perform a forced handover of the mobile station 30 to the HBTS cell without performing transmission of new handover parameters 203 or further measurement report 204. Interference is less of an issue for the inter-frequency or inter-RAT case, as long as the mobile station 30 is within the coverage area of the HBTS 20. This can be deduced from measurement report 202 based on received signal strength information sent with the load indication.

The advantage of this solution is that it does not affect the interference level experienced by non members of a CSG for the HBTS 20, which happen to be in the femtocell coverage area 25 when the power is increased. This was a problem identified with the first embodiment described above. Moreover, this solution only involves over the air signalling rather than signalling over the Core Network. However, the chances of a call drop increases if the mobile station is handed over to an HBTS with poor coverage.

Figure 4:
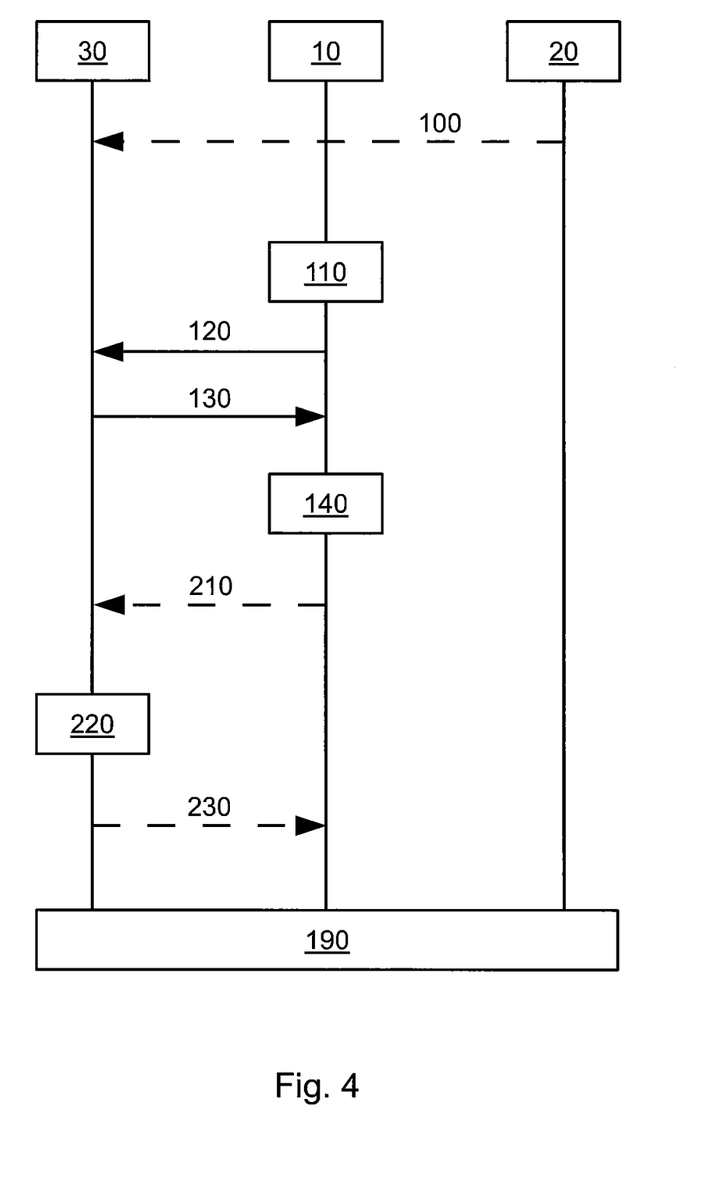
FIG. 4 shows an example of data flow between parts of the cellular network according to FIG. 3.

Referring next to FIG. 4, there is shown an example of data flow between parts of the cellular network according to FIG. 3. Where the same features are indicated in FIG. 4 as in FIG. 2, identical reference numerals are used.

The key differences between FIG. 4 and FIG. 2 relate to the sequence of events following load balancing 140. RRC connection reconfiguration command 210 comprises the adjusted handover parameters 203. Then in measuring step 220, the mobile station 30 prepares a measurement report for handover triggered at the mobile station 30. The mobile station 30 then transmits measurement report 230 to the MBTS 10. As explained above, the RRC connection reconfiguration command 210, measuring step 220 and measurement report transmission 230 are optional.

Although embodiments of the system described herein have been described above, the skilled person may contemplate various modifications.

For example, although the MBTS 10 is described as determining the load balancing configuration, this decision may be established by the mobile station (UE) 30. Here, the mobile station 30 may use the received load information from the HBTS 20, to determine whether it should handover to the HBTS 20. The mobile station 30 may establish that the received load information indicates that the HBTS 20 is congested or overloaded. Then, the mobile station can autonomously decide not to handover to the second base station.

It does this by indicating to the MBTS 10 that it is not allowed access to the second base station and the MBTS 10 is then configured not to initiate handover of the mobile station 30 to the HBTS 20. This indication can advantageously be achieved by reusing the existing signalling for indicating access rights to a cell with a CSG identity. This can be used to indicate that the mobile station 30 has no access right to the HBTS 20. In other words, the mobile station 30 need not forward any information about the actual load of the HBTS 20 to the MBTS 10.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of operating a cellular network including a first base station, being a macro base station, a second base station, being a home base station, and a mobile station being served by the first base station, the method comprising:
   receiving, at the mobile station, a load balancing command from the first base station instructing that the mobile station is to obtain load information from the second base station;
   receiving the load information from the second base station at the mobile station, the load information indicating a load placed on the resources of the second base station;
   determining, at the mobile station, a load indication based on the received load information of the second base station;
   communicating the load indication from the mobile station to the first base station; and
   determining a load balancing configuration at the first base station based on the load indication for the second base station, the load indication for the second base station having being received at the first base station from the mobile station.

2. The method of claim 1, wherein the home base station is a non-planned base station or a femtocell base station.

3. The method of claim 1, further comprising:
   identifying the existence of the second base station at the mobile station.

4. The method of claim 1, further comprising:
initiating a handover process for the mobile station from the first base station to the second base station; and wherein the load information is received at the mobile station from the second base station as part of the handover process.

5. The method of claim 1, wherein the load information comprises an indication of resource usage at the second base station, relating to a group of mobile stations being served by the second base station.

6. The method of claim 5, wherein the group of mobile stations being served by the second base station comprises one or more of: guaranteed bit-rate, GBR, mobile stations; non-GBR mobile stations; member mobile stations of a closed service group of the second base station; and mobile stations that are not members of a closed service group of the second base station.

7. The method of claim 1, further comprising:
communicating instructions from the first base station in order to effect the determined load balancing configuration.

8. The method of claim 7, wherein the instructions from the first base station are directed to the second base station through a backhaul communications channel and comprise an instruction for the second base station to increase its downlink transmission power.

9. The method of claim 7, wherein the instructions from the first base station are directed to the mobile station and comprise instructions causing handover of the mobile station away from the first base station.

10. The method of claim 9, wherein the instructions from the first base station directed to the mobile station comprise instructions directing the mobile station to handover to the second base station.

11. The method of claim 1, further comprising:
determining a local load balancing configuration at the mobile station, based on the received load information for the second base station, wherein the load indication communicated from the mobile station to the first base station comprises an indication to effect the determined local load balancing configuration at the mobile station.

12. The method of claim 11, wherein the load indication to effect the determined local load balancing configuration at the mobile station causes the first base station to be configured not to initiate handover of the mobile station to the second base station.

13. The method of claim 1, wherein the first base station and second base station differ in one or more of: their carrier frequency; and their radio access technology.

14. The method of claim 1, wherein the home base station is a femtocell base station including:
a downlink transmitter; and
a controller, configured to control the downlink transmitter to transmit the load information, the load information indicating the load placed on the resources of the femtocell base station.

15. A mobile station of a cellular network, comprising:
a downlink receiver;
an uplink transmitter; and
a controller configured to control the downlink receiver and uplink transmitter to allow the mobile station to be served by a first base station, being a macro base station, and further configured to:
receive at the mobile station a load balancin command from the first base station instructing that the mobile station is to obtain load information from a second base station, being a home base station;
control the downlink receiver to receive the load information from the second base station, the load information indicating a load placed on the resources of the second base station;
determine, at the mobile station, a load indication based on the received load information of the second base station; and
control the uplink transmitter to transmit the load indication to the first base station, the load indication, once received at the first base station from the mobile station, being useable to determine a load balancing configuration at the first base station based on the load indication.

16. A non-transitory computer readable medium storing software for operating a cellular network including a first base station, being a macro base station, a second base station, being a home base station, and a mobile station being served by the first base station, the software comprising:
executable code that receives, at the mobile station, a load balancing command from the first base station instructing that the mobile station is to obtain load information from the second base station;
executable code that receives the load information from the second base station at the mobile station, the load information indicating a load placed on the resources of the second base station;
executable code that determines, at the mobile station, a load indication based on the received load information of the second base station;
executable code that communicates the load indication from the mobile station to the first base station; and
executable code that determines a load balancing configuration at the first base station based on the load indication for the second base station, the load indication for the second base station having being received at the first base station from the mobile station.

17. The non-transitory computer readable medium of claim 16, wherein the software further comprises:
executable code that identifies the existence of the second base station at the mobile station.

18. The non-transitory computer readable medium of claim 16, wherein the software further comprises:
executable code that initiates a handover process for the mobile station from the first base station to the second base station, wherein the load information is received at the mobile station from the second base station as part of the handover process.

19. The non-transitory computer readable medium of claim 16, wherein the load information comprises an indication of resource usage at the second base station, relating to a group of mobile stations being served by the second base station.

20. The non-transitory computer readable medium of claim 16, wherein the software further comprises:
executable code that communicates instructions from the first base station in order to effect the determined load balancing configuration.

21. The non-transitory computer readable medium of claim 16, wherein the software further comprises:
executable code that determines a local load balancing configuration at the mobile station, based on the received load information for the second base station, wherein the load indication communicated from the mobile station to the first base station comprises an indication to effect the determined local load balancing configuration at the mobile station.

22. The non-transitory computer readable medium of claim 21, wherein the load indication to effect the determined local load balancing configuration at the mobile station causes the first base station to be configured not to initiate handover of the mobile station to the second base station.

* * * * *